2,989,520
SULFONIUM ETHER DERIVATIVES OF STARCH
Morton W. Rutenberg, North Plainfield, and Joseph L. Volpe, New Brunswick, N.J., assignors to National Starch and Chemical Corporation
No Drawing. Filed Apr. 22, 1959, Ser. No. 807,982
1 Claim. (Cl. 260—233.3)

This invention relates to a method for the preparation of sulfonium starch ethers, and to the novel products thus obtained.

It is our object to provide improved starch ethers characterized by the presence of one or more sulfonium groups. An additional object is to obtain, by the use of such sulfonium starch ethers, aqueous starch dispersions characterized by notably improved clarity and viscosity stability, as compared to dispersions made from the corresponding untreated starch. Additional objects include the use of these sulfonium starch ethers as sizing agents, thickeners, adhesives, and for those other applications where starches are employed.

We have now found that such products may be made by treating starch with a reagent which contains a sulfonium group, and which is capable of reacting with the starch through an ether linkage. Examples of this type of etherification reagents are the halogenoalkyl sulfonium salts, the vinyl sulfonium salts and the epoxy alkyl sulfonium salts. Equivalents of these reagents, and suitable for the purposes of this invention, are the corresponding compounds containing more than one sulfonium group; also those containing aryl, aralkyl and cycloalkyl groups. It is seen that the only essential requirement is that the reagent contain a sulfonium group, and that it be capable of reacting with the hydroxyl groups of starch through an ether linkage (regardless of whether this linkage be through a halogen, epoxy or vinyl group).

Among the above mentioned types of reagents, we prefer the beta-halogenoalkyl sulfonium salts.

Representative examples of suitable etherification reagents for the purposes of our invention include 2-chloroethyl-methyl-ethyl sulfonium iodide; 2-chloroethyl-dimethyl sulfonium iodide; beta-chloroethyl-methyl-[2-(ethyl-methyl sulfonium) ethyl] sulfonium diiodide; vinyl-ethyl-methyl sulfonium iodide; dimethyl-2,3 epoxypropyl sulfonium iodide; dimethyl-p-chloromethyl phenyl sulfonium iodide; methyl-cyclohexyl-chloroethyl sulfonium iodide; and benzyl methyl 2-chloroethyl sulfonium iodide. The various halide salts of the above reagents (e.g., chloride, bromide, etc.) as well as their different haloalkyl derivatives (e.g., bromoalkyl, iodoalkyl, etc.) can be used interchangeably in the process of our invention.

In general, the beta-halogenoalkyl sulfonium salt reagents are prepared by treating beta-hydroxyalkyl thioalkyl ethers with thionyl chloride. The resulting halogenoalkyl thioalkyl ethers are then isolated and alkylated by reaction with an alkyl halide, yielding a beta-halogenoalkyl sulfonium salt or the corresponding aryl, aralkyl, or cycloalkyl derivative, depending, of course, upon the specific nature of the starting thioalkyl ether. Vinyl sulfonium salt reagents may be prepared, for example, by the dehydrohalogenation of beta-halogenoalkyl sulfonium salts; while one method for the preparation of epoxy alkyl sulfonium salts involves the epoxidation of alkylene sulfonium salts.

The starch ethers resulting from our process include the dialkyl sulfonium alkyl and the dialkyl sulfonium hydroxyalkyl starch ethers. The derivatives may contain one or more than one sulfonium group, and as already stated, may containing aryl, aralkyl or cycloalkyl groups.

Broadly, all of the starch derivatives of our invention may be described by the structural formula:

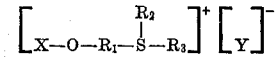

wherein X is starch; $R_1$ is a radical selected from the group consisting of alkylene, hydroxyalkylene, aralkylene, cycloalkylene, and phenylene radicals; each of $R_2$ and $R_3$ is a radical selected from the group consisting of alkyl, aryl, aralkyl, cycloalkyl and alkylene sulfonium radicals and wherein any of said $R_2$ and $R_3$ radicals may also contain ether oxygen linkages and amino groups, and Y may be any anion.

When we use the term "starch," we include in that term any amylaceous substances, whether untreated or chemically modified, which still retains free hydroxyl groups capable of entering into the reaction of this invention. Thus, the sulfonium ethers may be formed with native, untreated starch, as well as dextrines, hydrolized, oxidized, esterified or etherified starches. The starches may be derived from any plant source, such for example as corn, potato, tapioca, waxy maize, sago, rice, or the like.

In using the products of our invention as adhesives, sizing agents and thickeners, it is ordinarily desirable that they be in the form of aqueous dispersions or pastes. These dispersions are made by heating the suitable amount of starch derivative and water to a temperature of approximately 200° F. Upon cooling, it will be noted that the resulting dispersions are considerably clearer and more resistant to viscosity change upon standing than similar dispersions prepared with the corresponding untreated starch. Furthermore, it has been observed that our novel starch derivatives display a positive electrical charge, a property which may be useful in some applications as in the sizing of paper pulp which, as is known in the art, carries a negative charge.

The preparation of our sulfonium starch ethers is preferably carried out by treating the starch with the etherification reagent in the presence of an alkaline catalyst. This is preferably accomplished by suspending the starch in water, to which has been added (either before or after addition of the starch) sufficient base, such as an alkali metal carbonate, alkali metal or alkaline earth hydroxide, quaternary ammonium hydroxide, or the like, to maintain the mixture in an alkaline state during the reaction. The required amount of beta-halogenoalkyl sulfonium salt, or equivalent type of reagent being employed, is then added with constant agitation. We have found that the reaction is usually complete in approximately 16–20 hours although the practitioner will find that various factors, such as temperature, reactivity of the particular reagent used, etc., will affect the reaction period. The resulting reaction mixture may then be conveniently diluted with water and its pH adjusted to a value of 3–3.5 by the addition of dilute mineral acid, preferably hydrochloric acid. The reaction product, if ungelatinized, may then be recovered by filtration, washed with water and finally dried. The above described procedure relating to the dilution, pH adjustment, and recovery of our products may, of course, be varied or omitted in order to suit the particular requirements. Thus, for example, some may prefer to use the reaction mixture without further treatment.

It is well known that starch, which in its natural state is in the form of discrete granules will, in the presence of water and sufficient alkali, undergo gelatinization. The phenomenon of gelatinization involves the swelling, rupture and disintegration of the starch granule. Such a gelatinized starch, when dried and subsequently mixed with sufficient water, will form a homogeneous hydrated colloidal dispersion, without need for cooking, whereas ungelatinized starch granules, on the other hand, will settle out of cold water suspension and may be filtered and dried, still retaining their original granule form. Thus, in the above described reaction procedure we have outlined the preparation of a sulfonium starch ether which still retains its discrete form. This product may be used in this form or it may be redispersed in water and passed over heated metal drums so as to result in the production of the "drum-dried" derivative, which is now, however, a dry, cold water soluble product which no longer possesses the intact granule structure of the original starch. The gelatinized form of these derivatives may also be prepared by running the etherification reaction upon a starch which had previously been gelatinized. Still another alternative procedure for obtaining our derivatives in the form of cold water dispersible products involves conducting the etherification reaction on an ungelatinized starch but in the presence of sufficient heat and/or alkali so as to simultaneously effect gelatinization and etherification. In any case, however, the ultimate products of our process, whether they be gelatinized or ungelatinized, are always sulfonium ethers of starch.

Our derivatives may also be prepared by a reaction which is run in the absence of added water, other than that normally present in the starch. Thus, the starch may be suspended in an inert organic solvent medium such as, for example, isopropyl alcohol. An alkaline material is then added and the etherification reagent introduced. The mixture is heated at reflux temperatures so as to complete the etherification reaction. The resulting derivative is then separated by filtration or other suitable means.

The proportion of etherification reagent to be used will vary with the particular reagent chosen (since they naturally vary in reactivity and reaction efficiency) and the degree of substitution desired. Thus, we have obtained products with substantially improved properties by using as little as 0.5% etherification reagent, based on the weight of starch. We have noted no critical upper limit for the amount of reagent, this of course again being controlled by such factors as the desired degree of substitution and the manner in which the reaction is to be run.

As for the amount of alkaline material, it has already been pointed out that enough should be present to maintain the reaction mass in an alkaline state during the reaction. There is no critical upper limit of alkali, except that it should be remembered that excessive alkalinity, in the presence of water, will cause starch to gelatinize and lose its intact granule structure. Thus, if one wishes to obtain the final starch ether in ungelatinized form, the amount of alkali should be kept below that point which will gelatinize the starch. Alternatively, one may add a known gelatinization retarding chemical, such as sodium sulfate, to the reaction mass.

The following examples will further illustrate the embodiment of our invention. In these examples all parts given are by weight unless otherwise noted.

*Example I*

This example illustrates the treatment of corn starch with 2-chloroethyl-methyl-ethyl sulfonium iodide, using calcium hydroxide as the alkaline catalyst.

An aqueous slurry containing 2 parts of calcium hydroxide in 125 parts of water was prepared, in a vessel equipped with mechanical agitation. With constant agitation, 100 parts of corn starch were added, followed by 6 parts of 2-chloroethyl-methyl-ethyl sulfonium iodide. The reaction was allowed to proceed at a temperature of 72° F. After 16 hours the reaction mixture was diluted with 500 ml. of water and the pH was adjusted to 3–3.5 by the addition of dilute hydrochloric acid. The granular starch reaction product was recovered by filtration, washed twice by suspension in 250 ml. portions of water, and then air dried.

When one part of this product was dispersed by being heated in 12 parts of water, at pH 4, for a period of twenty minutes at 200° F., it formed a dispersion which upon cooling was clearer and considerably more stable to viscosity change than the corresponding dispersion prepared from ordinary untreated corn starch. The dispersion was successfully employed as an adhesive for the bonding of paper and was also useful as a sizing agent in the wet processing of paper.

*Example II*

This example presents additional formulations of sulfonium starch ethers, with variations in the amount of reagent, amount and type of alkaline catalyst, and the starch base employed. In preparing the formulations shown in the following table, the procedure was the same as described in Example I. Formulations 2–9 required a reaction period of 16–20 hours, at room temperature. However, Formulation #1 was reacted at 115° F., and Formulation #10, after reacting for 16 hours at room temperature, was heated for an additional 7 hours at 120° F. The etherification reagent employed for Formulations #1 through #9 was 2-chloroethyl-methyl-ethyl sulfonium iodide, while benzyl methyl 2-chloroethyl sulfonium iodide was used in the preparation of Formulation #10.

| Formulation # | Starch Base (100 parts) | Alkaline Catalyst | Parts Alkaline Catalyst | Parts Reagent |
|---|---|---|---|---|
| 1 | corn | NaOH | 2.0 | 6.0 |
| 2 | do | Ca(OH)$_2$ | 1.0 | 0.5 |
| 3 | do | Ca(OH)$_2$ | 0.7 | 2.0 |
| 4 | do | Ca(OH)$_2$ | 3.3 | 10.0 |
| 5 | do | Na$_2$CO$_3$ | 4.8 | 6.0 |
| 6 | do | (CH$_3$)$_4$NOH* | 6.2 | 6.0 |
| 7 | waxy maize | Ca(OH)$_2$ | 2.0 | 6.0 |
| 8 | potato | Ca(OH)$_2$ | 2.0 | 6.0 |
| 9 | tapioca | Ca(OH)$_2$ | 2.0 | 6.0 |
| 10 | corn | Ca(OH)$_2$ | 2.3 | 6.2 |

*Tetramethylammonium hydroxide.

All of these formulations yielded dispersions, prepared as in Example I, which were characterized by improved properties as compared with similarly prepared dispersions derived from the respective untreated starch base, i.e., corn, waxy maize, potato, or tapioca. These properties, which varied with different starches, included superior viscosity stability, increased clarity and cohesiveness, and the presence of a positive electrical charge. The latter was a property which was present in all of the preparations of our invention. These formulations were successfully employed as textile thickening agents and as adhesives for the bonding of paper.

*Example III*

This example describes the preparation of a pregelatinized sulfonium starch derivative.

In this case the derivative was prepared by running the etherification reaction upon a starch which had already been gelatinized. The starch was prepared by dispersing in 150 parts of water, 100 parts of a corn starch which had previously been acid converted to a degree known in the trade as 75 fluidity. Gelatinization was effected by adding to the dispersion a solution of 3 parts of NaOH in 50 parts of water, and heating on a boiling water bath for a period of 10 minutes. After adding 200 parts of water, the gelatinized dispersion was cooled, with stirring, to room temperature whereupon 7 parts of 2-chloroethyl-methyl-ethyl sulfonium iodide were added to initiate the etherification reaction. The reaction proceeded for approximately 20 hours at room temperature.

The reaction product was recovered by alcohol precipitation, after adjusting the pH of the reaction mixture to a value of 4 by the addition of dilute HCl. The product was then filtered, washed with alcohol and air dried. The pregelatinized sulfonium starch ether produced by this procedure readily dispersed in cold water to yield clear, viscosity stable dispersions which were used as sizing materials in the paper making process, displaying a marked attraction for the paper pulp.

In summary, it is seen that our invention makes possible the introduction of sulfonium groups into starch by a simple and commercially feasible method, and provides starch ethers of real value in numerous industrial applications. Many variations in materials, procedures and proportions will be apparent to the skilled practitioner, without departing from the scope of the invention, which is limited only by the following claims.

We claim:

An etherification product of starch having the following structural formula:

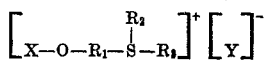

wherein X is starch; $R_1$ is a radical selected from the group consisting of alkylene, hydroxyalkylene, aralkylene, cycloalkylene, and phenylene radicals; each of $R_2$ and $R_3$ is a radical selected from the group consisting of alkyl, aryl, aralkyl, cycloalkyl and alkylene sulfonium radicals and wherein any of said $R_2$ and $R_3$ radicals may also contain ether oxygen linkages and amino groups, and Y may be any anion.

References Cited in the file of this patent

UNITED STATES PATENTS

| | | |
|---|---|---|
| 2,580,351 | Grassie | Dec. 25, 1951 |
| 2,580,352 | Grassie | Dec. 25, 1951 |
| 2,773,057 | Hjermstad et al. | Dec. 4, 1956 |
| 2,802,000 | Caldwell et al. | Aug. 6, 1957 |
| 2,883,375 | Fuller | Apr. 21, 1959 |

FOREIGN PATENTS

| | | |
|---|---|---|
| 525,107 | Canada | May 15, 1956 |